United States Patent [19]

Aaltonen et al.

[11] 4,381,370

[45] Apr. 26, 1983

[54] METHOD FOR PRODUCING FIRE-RETARDED CELLULOSIC FIBERS AND FIRE-RETARDED CELLULOSIC FIBERS

[75] Inventors: Olli Aaltonen; Martti Alkio, both of Espoo; Eero Avela; Riitta-Maija Housh, both of Helsinki, all of Finland

[73] Assignee: The Technical Research Centre of Finland, Espoo, Finland

[21] Appl. No.: 246,102

[22] Filed: Mar. 20, 1981

[30] Foreign Application Priority Data

Mar. 28, 1980 [FI] Finland .................................. 800963

[51] Int. Cl.³ .............................................. D01F 8/02
[52] U.S. Cl. ............................... 525/54.21; 525/54.23; 526/238.21; 527/311; 527/313; 527/314; 106/165; 106/187; 106/203; 536/57; 536/84
[58] Field of Search .......... 260/9, 16, 22 XA, 23 XA, 260/30.8 DS, DIG. 24; 106/165, 187, 203; 536/57, 84; 525/54.21, 54.23; 526/238.21; 527/311, 313, 314; 524/35, 770

[56] References Cited

U.S. PATENT DOCUMENTS

| | | | |
|---|---|---|---|
| 2,052,478 | 8/1936 | Lilienfeld | 536/84 |
| 2,163,607 | 6/1939 | Lilienfeld | 536/57 |
| 3,359,155 | 12/1967 | Kajitani | 536/57 |
| 4,049,747 | 9/1977 | Jin et al. | 260/DIG. 24 |
| 4,097,666 | 6/1978 | Johnson et al. | 536/57 |
| 4,186,156 | 1/1980 | Gibbs | 260/DIG. 24 |
| 4,252,766 | 2/1981 | Baldini et al. | 264/187 |

*Primary Examiner*—John Kight, III
*Assistant Examiner*—Nathan M. Nutter
*Attorney, Agent, or Firm*—Bucknam and Archer

[57] ABSTRACT

A method for producing fire-retarded blend fibers having a fire resistance LOI-value of at least 21% $O_2$, made from cellulose and chlorine containing polymer. Chlorine containing polymer having a chlorine content of 30–75% by weight, is blended, either as such or dissolved in a solvent, with a DMSO/formaldehyde solution of cellulose so that the obtained blend has 10–70% by weight of chlorine containing polymers, based on the total amount of cellulose and said polymers. Fibers are produced of the obtained mixture by bringing it into contact with an aqueous or alcoholic solution.

6 Claims, No Drawings

METHOD FOR PRODUCING FIRE-RETARDED CELLULOSIC FIBERS AND FIRE-RETARDED CELLULOSIC FIBERS

The present invention relates to a method for producing fire-retarded blend fibers of cellulose and chlorine-containing polymers.

Cellulose fibers, like cotton or viscose, as such are highly inflammable and burn fast.

The combustibility of textiles, primarily their extinction properties, can be expressed by their LOI value (Limiting Oxygen Index). In this method the smallest oxygen content needed to sustain the combustion of the material is determined by using a blend of oxygen and nitrogen. If the LOI value is clearly higher than the oxygen content of air (21%), the combustion will cease spontaneously. The LOI values of different fiber qualities are given in the following table (L. Pakkala, Tekstiililehti "Textile Magazine" No. 3, 1973):

TABLE 1

| Fiber | LOI |
|---|---|
| Polyacrylonitrile | 18.2 |
| Cotton | 18.4 |
| Cellulose triacetate | 18.4 |
| Cellulose diacetate | 18.6 |
| Viscose | 19.7 |
| Polyester | 20.6 |
| Wool | 25.2 |
| Modacrylate | 26.8 |
| PVC | 37.1 |
| Cotton/polyester 50/50 | 18.0 |

The combustibility of a fiber blend cannot be determined out of the combustibility of the separate components, but the determination must always be made out of the blend.

As fire retardants for cellulosic fibers, phosphorus-, chlorine-, bromine-, antimony-, tungsten- or boron-bearing compounds are used which are added to the fiber usually at the finishing stage. Also bromine-bearing organic phosphorous compounds have been blended with viscose prior to the spinning of the fiber.

The most common fire retardants for cellulose fibers are:

1. Ammonium phosphates, -sulphates and -halides as well as sodium borates.

The disadvantage of these substances is their water solubility. The material loses its fire-retardant properties after washing with water.

2. N-methylol-2 (dimethylphosphonatoyl-)-propionamide and tetrakishydroxymethylphosphoniumchloride or -sulphate.

Disadvantages of these characteristically stable fire retardants are the expensive chemicals, multistage fire-retardant finishing, the coarse and inflexible hand of the fabric, lower light and weather resistance. In addition when heated they develope strong toxins, such as phosphines.

3. Chlorinated hydrocarbon/antimony oxide.

Disadvantages of this finishing process applied only to products that are to be used outdoors, are the coarseness and inflexibility of the product as well as its impermeability to air. The use of antimony causes occupational safety problems.

4. Tris-dibromopropylphosphate blended with viscose before spinning (about 15% of the amount of cellulose).

The disadvantage of these "built-in" fire retardants is their effect upon the crystallization of cellulose which causes the strength of the fiber to decrease vigorously. The substance has been found to be mutagenous and its use is forbidden in the USA.

In the production of viscose fiber, such organic polymers that, spun into fibers together with cellulose, could have advantageous fire-retardant properties, cannot be dissolved in an aqueous cellulose xanthogenate solution (viscose), (see table 1).

It has been suggested (Grinshpan, Kaputskii, Savitskaja, Zhurn, Priklad. Khim., 50, 1977, 702) that e.g. PVC could be added to cellulose that has been dissolved in a blend of nitrogen tetroxide ($N_2O_4$) and dimethyl formamide (DMF); and that PVC could be regenerated in the form of fibers together with cellulose. The production of cellulosic fibers out of $N_2O_4$/DMF solution of cellulose has, however proved to be uneconomical and not a single production unit using this method has been established.

The object of this invention is to bring about a method to produce blend fibers of cellulose and chlorine-containing polymers which have a fire resistance with the LOI value of at least 21% $O_2$.

The present invention is based on the observation that by using a new solvent of cellulose, i.e. a blend of dimethyl sulfoxide (DMSO) and paraformaldehyde (PF) (U.S. Pat. No. 4,097,666) it is possible to blend different chlorine-containing polymers into the cellulose in solution, in such blending proportions that when the blend is spun into fibers it yields a product which has, compared to cellulosic fibers, remarkably improved fire-retardant properties.

Furthermore, it has been proved that chlorine-containing polymers can be blended into a cellulose solution only in certain proportions. Otherwise the blend will gel and the spinning of it into fibers is not possible. In addition to the blending proportions other factors somewhat affecting the gellability are the total polymer content of the blend are the degrees of polymerization, the cellulose/formaldehyde molar ratio as well as the temperature of the blend. Table 2 presents the practical blending proportions of some polymers.

TABLE 2

| Polymer | Chlorine content % | Blending ratio (cellulose/polymer) | | | | |
|---|---|---|---|---|---|---|
| | | 90/10 | 70/30 | 50/50 | 30/70 | 20/80 |
| Polyvinylchloride PVC | 57 | — | — | gel | gel | gel |
| Chlorinated polyvinyl-chloride CPVC | 62–64 | — | — | gel | gel | gel |
| Vinylchloride and vinyl-acetate copolymer (PVC/PVAc) | 50 | — | — | gel | gel | gel |
| Vinylidene chloride and vinylchloride copolymer (PVDC/PVC) | 71–72 | — | — | gel | gel | gel |
| Acrylonitrile and vinyli- | 36 | + | + | + | + | gel |

TABLE 2-continued

| Polymer | Chlorine content % | Blending ratio (cellulose/polymer) | | | | |
|---|---|---|---|---|---|---|
| | | 90/10 | 70/30 | 50/50 | 30/70 | 20/80 |
| denechloride copolymer, modacrylate | | | | | | |
| Acrylonitrile and vinylchloride copolymer, modacrylate | 34 | + | + | + | gel | gel |

+ blend is clear, spinnable
− blend is turbid, spinnable

In certain cases the addition of a third polymer which causes a diminution of the drop-size in the dispersion, improves the spinnability of the solution of cellulose and chlorine-containing polymers, as well as the quality of the spun fibers. Suitable polymers are e.g. cellulose ethers and -esters, modacrylate, polyacrylate, polyacrylonitrile, polyacrylic acid, polyvinylalcohol or polyvinyl pyrrolidone.

It has been found, quite unexpectedly, that those chlorine-containing polymers which decompose, discolour dark brown and gel the solution when dissolved in DMSO as such, are, in fact, very stable when blended with a DMSO/PF solution of cellulose. This subsequents to the remarkable advantage that the use of stabilizers in the spinning solutions is usually unnecessary.

In the method for producing fire-retarded cellulose-based fibers according to the invention, chlorine-containing polymers, such as PVC or acrylonitrile and vinylidene chloride copolymer (modacrylate), containing 30–75% chlorine by weight is added into a DMSO/PF solution of cellulose in such proportions that the solution will not gel. The solutions according to the invention contain 10–70% by weight of chlorine-containing polymer or polymers based on the total amount of cellulose and chlorine-containing polymers. The chlorine-containing polymer may be dissolved straight in the cellulose solution, or first in a suitable organic solvent which is then mixed with the cellulose solution. Fibers are manufactured out of the obtained blend, which can be a completely clear solution or turbid, by feeding it through spinnerette holes or otherwise to an aqueous or alcoholic solution. When using at least 10% of polymer, containing at least 30% of chlorine, based on the total amount of cellulose and polymer, the obtained fiber has an LOI value of at least 21% $O_2$, subsequently its fire-retardant properties are remarkably better than those of a plain cellulose fiber.

The invention has the following advantages over the known methods for fire-proofing of cellulosic fibers:
(a) the method yields a product in which the fire retardant is "built-in". The blend is homogenous throughout the fiber,
(b) the fire retardant does not dissolve in the spin bath when processing fiber but precipitates completely together with the cellulose fiber. No chemical losses occur,
(c) the fire retardants are not water soluble, thus the fire-retardancy of fiber is permanent and will not weaken in wash,
(d) since the fire retardants are long chain polymers they orientate in the fiber production like cellulose does and do not have as a disadvantageous effect on the strength properties of fiber as the known fire retardants have,
(e) the addition of chlorine-containing polymers to the cellulosic fiber by this method does not noticeably affect the hand of the fiber,
(f) the use of chlorine-containing polymers in the fibers does not cause any health hazards.

The following examples illustrate some of the advantageous embodiments of the method.

EXAMPLE 1. PREPARATION OF CELLULOSE SOLUTION 83 g air-dry, pre-hydrolyzed birch sulphate cellulose ($DP_v$=380), 83 g technical paraformaldehyde and 1100 g dimethyl sulfoxide were heated in a two-liter glass-reactor to 120° C. in about 1.5 hours. The obtained clear solution was heated in 120° C. for another 2.5 hours to remove the excess formaldehyde. The hot solution was filtered through a nylon cloth. The viscosity of the solution at 20° C. was 165 P and the formaldehyde/cellulose molar ratio was 1.2.

EXAMPLE 2. PREPARATION OF CELLULOSIC/PVC (60/40) BLEND FIBERS

DMSO and 55.3 g polyvinylchloride, a powder with a chlorine content of 57%, were blended with a hot cellulose solution prepared as set forth in example 1. The blend was shaken for 2 hours at a temperature of 70° C. The mixture was fed through the orifices ($\phi$ 0.08 mm) of a spinnerette into water to which a small amount of NaOH was added (0.001%). The fiber bundle was lifted 200 mm through the aqueous solution up onto godets where it was stretched 16%, washed and dried. The spinning speed was 20 m/min. The LOI value of the finished fiber bundle was 24–25% $O_2$. The LOI value of regenerated cellulose fiber prepared correspondingly was 18–19% $O_2$. The blend fiber with 40% of PVC extincted by itself in air after the flame had been removed. The blend fiber was somewhat curly and felt soft and warm.

EXAMPLE 3. PREPARATION OF CELLULOSE/MODACRYLATE (90/10) BLEND FIBERS 9.3 g of modacrylate with a chlorine content of 36% was added to a cellulose solution prepared as set forth in example 1. The blend was shaken for 2 hours at a temperature of 70° C. The obtained clear solution was spun to fiber as described in example 2. The LOI value of the finished fiber bundle was 21–22% $O_2$. This fiber burned in air clearly slower than the cellulosic fiber prepared correspondingly. The blend fiber felt soft and pleasant.

EXAMPLE 4. PREPARATION OF CELLULOSE/MODACRYLATE (50/50) BLEND FIBERS 83 g of modacrylate dissolved in dimethyl sulfoxide, was added to a cellulose solution prepared as set forth in example 1. The clear solution was spun to fibers as described in example 2. The LOI value of the finished fiber bundle was 25-26% $O_2$. The fiber extincted by itself in air after the removal of the flame. The blend fiber felt warm and soft.

EXAMPLE 5. PREPARATION OF CELLULOSE/MODACRYLATE (30/70) BLEND FIBERS 193.7 g modacrylate, dissolved in dimethyl sulfoxide, was added to a cellulose solution prepared as presented in example 1. The blend was shaken for 2 hours at a temperature of 50° C. The clear solution was spun to fibers as described in example 2. The LOI value of the fiber bundle was 26-27% $O_2$. The fiber extincted by itself in air after the removal of the flame. The blend fiber felt pleasantly soft.

EXAMPLE 6. PREPARATION OF CELLULOSE/MODACRYLATE/PVC (50/40/10) BLEND FIBERS 66.4 g of modacrylate, dissolved in dimethyl sulfoxide, and 16.6 g polyvinylchloride, dissolved in dimethylformamide, were added to a cellulose solution prepared as described in example 1. The blend was shaken for 2 hours at 60° C. The turbid solution was spun to fibers as set forth in example 2. The LOI value of the finished fiber bundle was 24-25% $O_2$. The fiber extincted in air by itself after the removal of the flame. The blend fiber felt soft.

EXAMPLE 7. PREPARATION OF CELLULOSE/VINYLIDENECHLORIDE-VINYLCHLORIDE COPOLYMER (90/10) BLEND FIBERS 9.4 g PVDC/PVC copolymer with a chlorine content of 72% was added to a cellulose solution prepared as set forth in example 1. The blend was shaken for 2 hours at 60° C. The obtained turbid solution was spun to fibers by using the equipment described in example 2 with technical-grade ethanol as the coagulation bath. The fiber was washed with ethanol, then with water and finally dried. The LOI value of the finished fiber bundle was 22-23% $O_2$. The fiber burned in air very slowly after the removal of the flame. The blend fiber was crimped and felt soft and warm.

EXAMPLE 8. PREPARATION OF CELLULOSE/POLYVINYLIDENECHLORIDE-VINYLCHLORIDECOPOLYMER/POLYACRYLONITRILE (70/20/10) BLEND FIBERS

Dissolved in dimethyl sulfoxide 23.7 g of PVDC/PVC-copolymer and 11.9 g of polyacrylonitrile, a polymer that does not contain any chlorine, were added to a cellulose solution, prepared as set forth in example 1. The blend was shaken for 2 hours at 60° C. The dispersion of the obtained turbid mixture had a smaller drop size than the solution according to the example 7. The spinning of the solution into fibers was performed as in example 7. The LOI value of the finished fiber bundle was 23-24% $O_2$. After removal of the flame the fiber burned in air extremely slowly or extincted entirely. The blend fiber was more homogenous and felt softer than the fiber prepared as set forth in example 7.

What is claimed is:

1. A method of producing fire-retarded blend fibers having a fire resistance LOI-value of at least 21% $O_2$, from cellulose which consists of forming a solution of cellulose of about 7% content in dimethyl sulfoxide/formaldehyde, mixing said solution with at least one chlorine-containing polymer, having a chlorine content of at least 30% but not more than 75% by weight to yield a non-gellable blend with at least 10% but not more than 70% by weight of at least one said chlorine-containing polymer, based on the total amount of cellulose and at least one said chlorine-containing polymer, extruding the blend through a spinnerette, into contact with a coagulating bath of an aqueous or alcoholic solution whereby fire retarded blend fibers are obtained.

2. A method in accordance with claim 1, wherein the chlorine-containing polymer is polyvinylchloride, and the blend of cellulose and polyvinyl chloride contains no more than 40% of said polyvinyl chloride.

3. A method in accordance with claim 1, wherein the chlorine-containing polymer is a member selected from the group consisting of (1) polyvinylchloride; (2) a mixture of polyvinylchloride and chlorinated polyvinyl chloride; (3) vinyl chloride and vinyl acetate copolymer; (4) vinylidene chloride and vinylchloride copolymer; (5) acrylonitrile and vinylidene chloride copolymer and (6) acrylonitrile and vinylchloride copolymer.

4. A method in accordance with claim 1, wherein the chlorine-containing polymer is a vinylidenechloride-vinyl-chloride-copolymer which is present in said blend in the amount not in excess of 30%, based on the total weight of vinylidene chloride-vinyl chloride copolymer and cellulose in said blend.

5. A method in accordance with claim 1, wherein said at least one chlorine-containing polymer is blended with a polymer which is a member selected from the group consisting of a cellulose ether, a cellulose ester, acrylonitrile-vinyl chloride copolymer, polyacrylonitrile, polyacrylic acid and polyvinyl alcohol.

6. A fire-retarded fiber which consists of a blend of cellulose and at least one chlorine-containing polymer, the chlorine content being at least 30 and not in excess of 75% by weight, at least one said chlorine-containing polymer being 10-70% by weight of said blend.

* * * * *